United States Patent [19]

Hoffman et al.

[11] 3,864,573

[45] Feb. 4, 1975

[54] WIDE-RANGE RADIATION GAGE FOR DETERMINING A MATERIAL PROPERTY

[75] Inventors: Carvel D. Hoffman, Whitehall; Duane T. Jones, Coopersburg, both of Pa.

[73] Assignee: Bethlehem Steel Corporation, Bethlehem, Pa.

[22] Filed: Aug. 20, 1973

[21] Appl. No.: 389,749

[52] U.S. Cl. .............................. 250/358, 250/369
[51] Int. Cl. .............................................. G01t 1/20
[58] Field of Search ........... 250/252, 358, 359, 360, 250/361, 363, 369

[56] References Cited
UNITED STATES PATENTS 3,524,063   8/1970   Mangan ......................... 250/252 X

*Primary Examiner*—James W. Lawrence
*Assistant Examiner*—Davis L. Willis
*Attorney, Agent, or Firm*—John I. Iverson; John I. Inversion; George G. Dower

[57] ABSTRACT

Photon radiation from a high energy nuclear source is beamed through a test material to gage a material property such as hot steel plate thickness which may be subject to temperature variation during gaging and grade variations from plate-to-plate. Emerging radiation strikes a scintillation detector having a self-balancing measuring loop, the latter consisting of a photodetector having a controlled-gain photomultiplier (PM) tube optically coupled to a scintillator and serially connected with a comparator-integrator which developes an error voltage and a variable dynode voltage source for the PM tube which is controlled by the error voltage. Gage operation is based on the phenomena of a nonlinear PM tube gain characteristic being inverse and nearly equal to a nonlinear radiation absorption characteristic of the test material. Thus, when emerging radiation varies in relation to the material property, it causes the error voltage to vary the dynode voltage which in turn controls tube gain in a manner to maintain anode current constant over a single wide range of material property gaging, even during radiation source decay and PM tube drift. Consequently, the dynode voltage varies slightly nonlinearly as a function of the test material property being gaged. The dynode voltage is also fed to a manual zero and attenuation comparator and then to a stepless linearizer for correcting the slight nonlinearity of a fraction of the dynode voltage. A compensator, operating under control of a data source and a pyrometer, modifies the linearized gaging signal to correct for effects thereon caused by material grade and temperature variations. The linearized and compensated gaging signal is fed through one input of a differential output amplifier to a digital gaging indicator, as well as to a gaging deviation profile meter, thereby providing readings corrected to what the material will gage when cooled to a room temperature. An automatic zero circuit, which consists of a switched integrator controlled by a test material detector, operates on the other input of the differential output amplifier to maintain the output of said amplifier at zero when there is no test material being gaged. Additional circuits provided in the gage enable profiling of the test material as well as calibrating the gage both mechanically and electrically.

16 Claims, 6 Drawing Figures

WIDE-RANGE RADIATION GAGE FOR DETERMINING A MATERIAL PROPERTY

CROSS-REFERENCE TO RELATED APPLICATIONS

"Wide-Range Radiation Gage Having A Controlled - Gain Photodetector For Determining A Material Property," Ser. No. 265,415, filed on June 22, 1972 by W. G. Bartlett, et al.

"Signal Conditioner Apparatus For Compensating An Electronic Material Gaging Signal," Ser. No. 265,110, filed June 22, 1972 by E. L. Mangan, et al.

"Radiation Gage With Sample And Hold Feature In Deviation Measuring Circuit," Ser. No. 265,140, filed on June 22, 1972 by W. G. Bartlett, et al.

BACKGROUND OF THE INVENTION

1. Field of the Invention

This invention relates broadly to improved gaging apparatus for determining a material property. More particularly it relates to an improved wide-range radiation gage having a controlled-gain photodetector for determining a material property. Hereinafter, the invention is described with reference to accurately measuring a wide range of steel plate thicknesses, or steel strip thicknesses, in a hot steel rolling mill which normally produces a steel product under variable operating conditions. However, it will become apparent that the invention is equally applicable to gaging other materials, and other properties such as weight per unit area or density, and to other industrial installations as well as to a variety of laboratory apparatus.

2. Description of the Prior Art

As noted in the Bartlett, et al, copending application Ser. No. 265,415 contemporary hot steel rolling mills utilize both manual-and computer-controlled gaging systems to facilitate high-speed production of hot steel plate and strip. Gaging systems require rapidly responsive, highly accurate, and quite reliable electrical signals representing linear indications of plate or strip thickness during a wide range of operating condition covering both variable production rates as well as material properties. For example, it is desired that thickness gages have a protracted accuracy of ± ½ percent in a hot steel rolling mill environment, yet read or provide electrical signals in terms of material thickness corresponding to what the material will be when later cooled to room temperature. In addition, gaging of a hot steel plate or strip must be done when material thickness varies in a range of up to 3 inches and more, material temperature is in a range of between 1,100° F. and 2,200° F. and varies during rolling, and material density, or composition or grade as it is frequently referred to, may be in a range of ± 10 percent of calibration standards, but is considered constant for a given run through a rolling mill. The Bartlett, et al gaging apparatus referred to in copending application Ser. No. 265,415 meets most of these requirements. Basically, this gage operates in response to the mass absorption phenomenon. That is, when test material is caused to enter a beam of penetrative radiation and its thickness varies linearly, the amount of radiation absorbed by the material per unit area thereof varies exponentially or nonlinearly. It is to be noted that radiation absorption, and therefore apparent material thickness, also varies (1) randomly because of the statistical manner in which radiation emanates from its source (2) as a complex function of radiation wave-length and intensity, (3) as a complex function of material composition or grade, and (4) as a predetermined function of material temperature, which function is considered linear for a given material composition having a temperature in a given range and subject to a constant predetermined rate of temperature change. Under other conditions function (4) is considered nonlinear.

More particularly, the Bartlett et al gaging apparatus supra, employs a stable high-energy nuclear source of photon radiation when used in a hot steel plate rolling mill, and a wide-range controlled-gain photodetector coupled to a scintillator that converts the beam of radiation emerging from the steel plate into light which varies proportional to the nonlinear mass absorption phenomenon. The photodetector includes a photomultiplier tube having an exponential or nonlinear tube gain versus dynode voltage phenomenon which has been discovered to be inverse and nearly equal in effect to the nonlinear mass absorption phenomenon. Advantage is taken of this phenomena by operating the photomultiplier tube in a self-balancing feedback loop responsive to the scintillator light and wherein anode current flow causes the development of an error signal. The error signal regulates a controlled high voltage supply connected to the photomultiplier tube's dynodes, thereby varying dynode voltage and tube gain to maintain anode current substantially constant. As a result, the dynode voltage varies slightly nonlinearly as a wide-range measure of steel plate thickness. The gaging apparatus also includes servo-driven means for automatically zeroing a fractional portion of the dynode voltage when no plate is in the gage; multi-point diode function generator means for linearizing the zeroed voltage; means for scaling the linearized and zeroed voltage; means for scaling the linearized voltage into volts per units of thickness; signal conditioning means having a servo-driven proportioner for modifying the thickness signal for variations therein due to variations in plate composition and temperature; and a single, wide-range, digital thickness indicator driven by the linearized and conditioned thickness signal.

Many of the features of the Bartlett, et al gaging apparatus supra, have proved most satisfactory in a contemporary hot steel plate rolling mill. However, it has been observed that certain improvements in this gaging apparatus would be desirable for even better operation. First, it would be desirable to automatically compensate for radiation source decay and any other phenomenon resulting in a change in the amount of radiation impinging upon the scintillation detector. Second, to automatically correct for electrical drift in the gaging circuits. Third, to reduce self-balancing feedback loop gain so as to improve gage stability and accuracy. Fourth, to improve the compensation of the material gaging signal for variations therein due to grade and temperature variations. Fifth, to improve facilities for maintenance and calibration of the gaging apparatus. Sixth, to provide additional capability for automatically profiling the material property being gaged.

SUMMARY OF THE INVENTION

One of the objects of this invention is to provide improvements in the aforesaid radiation gaging apparatus which will satisfy the desirability for better gage operation.

Another of the objects of this invention is to provide an improvement in the aforesaid radiation gaging apparatus which automatically compensates for radiation source decay and other phenomenon resulting in a change in the amount of radiation impinging upon the scintillation dector.

Another object of this invention is to provide an improvement to the aforesaid gage to automatically correct for electrical drift in the gaging circuits.

A further object of this invention is to provide improvements to gage stability and accuracy.

Another object of this invention is to provide the aforesaid gage with improved compensation of the material gaging signal for variations therein due to variations in other material properties which affect the gaged property.

Still another object of this invention is to provide the aforesaid gage with improved facilities for maintenance and calibration.

A still further object of this invention is to provide the aforesaid gage with the additional capability for automatically profiling the material property being engaged.

The foregoing objects can be obtained in the Bartlett et al radiation gaging apparatus covered in copending application Ser. No. 265,415 by modifying the measuring, zeroing, linearizing, and compensating circuits therein, and by adding new profiling and calibrating thereto. More particularly, the beam of photon radiation emerging from a hot steel plate being gaged still activates the scintillator and causes the photomultiplier (PM) tube anode current to cause the development of an error signal in the self-balancing measuring loop. However, a comparator-integrator replaces the former comparator alone and developes an integrated error signal instead of a plain error signal. The integrated error signal regulates the dynode voltage supply and therefore PM tube gain to maintain anode current at a constant value, even though the radiation source may decay or the PM tube gain characteristic may drift. A manually set zero and attenuator comparator replaces a servo-driven automatic zero circuit following the measuring loop to continuously develop a fraction of the slightly nonlinear dynode voltage which continuously represents the steel plate thickness. The linearizer is modified to use a logarithmic amplifier to provide a wide range of stepless linearizing of the dynode voltage fraction instead of using the multi-point diode function generator which formerly provided step type linearizing of this voltage in short discrete sections over a somewhat limited range. The grade and temperature compensator is modified substantially to use simplified sensing, scaling, and multiplying circuits for compensating the linearized thickness signal instead of separate scaling and complicated slope setting and servo-driven proportioning circuits for this same purpose. Electronic output circuit means including an integrator and material detector for automatically zeroing the linearized and compensated plate thickness signal during the absence of a plate in the gage is newly provided to eliminate system zero drift as may be indicated in the digital readout device. In addition, a digital thickness selector and converter are also newly provided to cooperate with the new electronic output circuit means and the existing digital thickness indicator for facilitating plate profiling and system calibration.

DESCRIPTION OF THE PREFERRED EMBOIDMENTS

Figure 1:
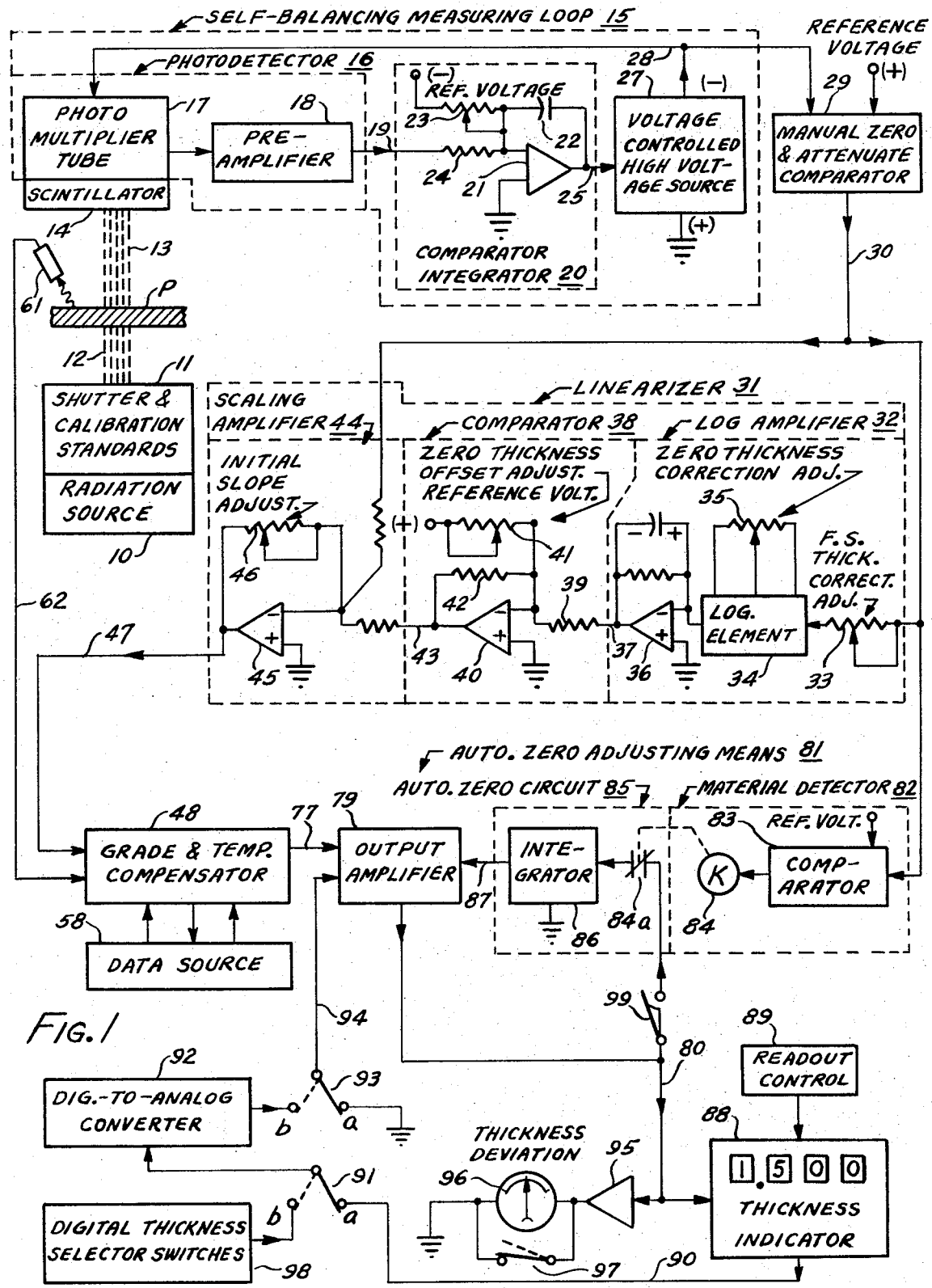
FIG. 1 is a schematic diagram of an improved wide-range radiation gage embodiment of the present invention.

Referring to FIG. 1, a preferred embodiment of the invention will be described in relation to improvements in the Bartlett et al wide-range radiation gage covered in copending application Ser. No. 265,415 for accurately measuring the thickness of a hot-rolled, low-carbon steel plate of known composition or grade, in 0.001 inch increments in a single range from 0.0 to 3.000 inches thickness. Measurements are made in a hot steel plate rolling mill environment as noted above. The invention is not limited to this embodiment as other materials and material properties, such as density and weight per unit area, may be substituted for hot steel plate thickness.

In the preferred embodiment shown in FIG. 1, the thickness gage utilizes a constant source of nuclear radiation 10, preferably monoenergetic, as a source of penetrative gamma photons. Three curies of Caesium 137, which emits energy at approximately 667 keV and has a half life of about 30 years, will insure adequate photon penetration of steel having a thickness of at least three inches.

Coupled to radiation source 10 is shutter and calibration standards assembly 11 which is of conventional design. Calibration standards consist of a plurality of individual discs of known composition each precisely ground to a predetermined thickness as required to cover the gage thickness range. Operation of the shutter and calibration standards may be by either manual or automatic controls, not shown.

Figure 2:
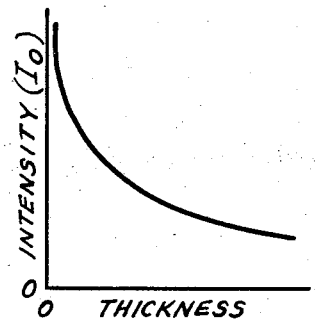
FIG. 2 is a graph illustrating the mass absorption phenomenon in terms of radiation emerging from material being gaged versus a material property such as thickness at a known density.

When the shutter is open, a beam of penetrative radiation 12 from constant source 10 is passed through steel plate P. In so doing, radiation beam 12 is subject to attenuation according to the nonlinear absorption phenomenon illustrated graphically in FIG. 2 and described by Bartlett et al, supra, to follow Lamberts law, modified for X-ray and nuclear radiation. Subsequently this beam becomes known as a beam of emergent radiation 13.

A portion of emergent radiation 13 is absorbed by scintillator 14 which converts gamma photon energy into a light source (not shown) that varies proportional to said radiation and therefore nonlinearly to the thickness of plate P. Sodium and caesium iodide crystals are efficient and acceptable scintillators. However, in addition to being costly, they have phosphorescent, or afterglow, characteristics which detract from meeting fast recovery requirements. The best results with regards to low noise and high speed of response are obtained by using the largest possible detector area and a non-phosphorescent material. Ruggedness to a steel rolling mill environment and reduced costs are other considerations. In view of the foregoing, it is preferred to use a non-phosphorescent doped plastic as supplied by Nuclear Enterprises, Inc., San Carlos, Calif., their type 110, as the material for scintillator 14. A cube shape is preferred rather than a conventional wafer, which is shown in FIG. 1 for the sake of simplicity, although other shapes will function satisfactorily.

In practice, cubic scintillator 14 is aligned so that one of its faces is perpendicular to emergent radiation 13. The resulting light source is optically coupled to self-balancing measuring loop 15 having a controlled-gain photo-detector 16 which is positioned against a cube face perpendicular to the first face and the remainder of the entire surface of scintillator 14 is made light-proof. With this arrangement, the unabsorbed portion of high energy radiation passes through a cube face opposite to the first face and into an absorber material not shown.

Both scintillator 14 and photodetector 16 are located as an assembly above a window in an environmentally controlled upper portion of a C-shape gage housing not shown. Radiation source 10 and shutter and calibration standards housing 11 are located beneath a window in the lower portion of the gage housing and so positioned that radiation beam 12 is directed toward, and aligned with scintillator 14. The gage housing is dimensioned so that the gage between the upper and lower portions will accommodate plate P in a horizontal plane, and further, be adapted to be stationary when plate P moves, or alternatively, is adapted to traverse plate P during gaging operations.

Figure 3:
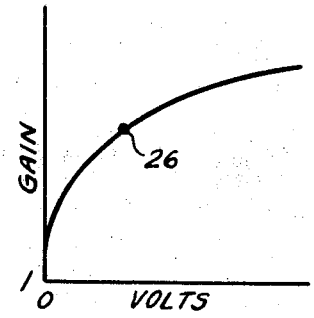
FIG. 3 is a graph illustrating the radiation detector's photomultiplier tube gain versus dynode voltage phenomenon.

Controlled-gain photodetector 16 includes photomultiplier (PM) tube 17 which converts the scintillator's nonlinear light source into a corresponding electrical signal in a manner described by Bartlett, et al, supra. Briefly, photomultiplier tube 17 is preferably an EMI type 9656KA, or equal, having a photocathode which converts the nonlinear light source into a source of electrons that varies proportional to light intensity, a string of about 10-dynodes having good secondary-emission for collecting the electrons, an anode, and a low dark current. A variable dynode energizing voltage from a source described below is applied to the dynode string which causes photomultiplier tube 17 to exhibit an exponential or nonlinear current gain as illustrated in FIG. 3. It therefore follows that when this tube is operated at a constant anode current as is done herein, an exponential or slightly nonlinear relationship exists between the thickness of plate P in beam 12 and the dynode energizing voltage. Thus, photodetector 16 functions as a controlled-gain device having a nonlinear gain characteristic inverse and nearly equal to the nonlinear light source, the latter varying according to the radiation absorption phenomenon noted above whether it be for plate P thickness, weight-per-unit area, or density.

Current from the anode of photomultiplier 17 is conducted directly to the input of high impedance operational preamplifier 18 included in photodetector 16. Amplifier 18 is connected as a current-to-voltage transducer, the photomultiplier tube's internal resistance constituting the input resistance thereof. Amplifier 18 includes a suitable feedback resistor (not shown) and a smoothing capacitor (not shown) thereacross, thereby providing a thickness related voltage representing photodetector 16 output at lead 19. This circuit arrangement provides minimum loading of photomultiplier tube 17 and reduces amplifier 18 noise effects over those of the conventional potentiometer types of current sensing.

As stated in Bartlett et al, supra, it should be noted that controlled-gain photodetector 16 has constant resistance circuits maintained internally through anode and dynode resistor networks to ground, thereby providing simplified photomultiplier tube 17 circuitry while maintaining constant operating characteristic throughout a single, wide range of gage measurements, as well as providing better operating stability and improved accuracy.

In order to provide the variable energizing voltage for the dynode string in photomultiplier tube 17, controlled-gain photodetector 16 is operated in self-balancing measuring loop 15 together with comparator-integrator 20 for automatically maintaining the gage calibration curve slope and curvature, FIG. 4 curve A, and an electronic-servo variable high voltage source described below. Comparator-integrator 20 consists of a summing amplifier 21 having an integrating capacitor 22 which permits a substantial reduction in overall measuring loop gain while maintaining a virtually constant anode current throughout a wide range of measurements. Device 20 also includes an internal reference voltage source (not shown) adjusted by potentiometer 23. The voltage on lead 19 is applied to summing resistor 24 to one input of amplifier 21 where it is combined with the sum of the feedback current from integrating capacitor 22 and the reference source current. The other input of amplifier 21 is grounded. Potentiometer 23 is adjusted initially when there is no plate P in radiation beam 12 so that a zero thickness integrated error voltage will appear both at the output of amplifier 21 and on output lead 25. This establishes operating point 26 on the curve in FIG. 3 initially when the photomultiplier tube 17 anode current is constant at about 60 nanoamperes. Integrating capacitor 22 cooperates with the comparator in device 20 to cause operating point 26 to automatically vary and maintain the anode current at its constant value so as to compensate for decay in radiation source 10, aging of photomultiplier tube 17, and other reasons sensed by photomultiplier tube 17. Integrating capacitor 22 functions to automatically stabilize self-balancing measuring loop 15 and therefore maintain the gage calibration slope and curvature constant over a wide range of plate P thickness. It is to be noted that while the anode current is held at its constant value, an integrated error voltage is produced on lead 25 when plate P is being gaged and this integrated error voltage constitutes the output of comparator-integrator 20.

The self-balancing measuring loop 15 includes an electronic servo in the form of voltage-controlled high voltage source 27 such as KEPCO Model No. OPS1,000 having a 1,000 volt D.C. maximum rating and a positive ground. Source 27 consists essentially of a high voltage operational amplifier which receives and amplifies the integrated error signal on lead 25 and produces a variable negative high voltage output on lead 28 which is fed as the dynode energizing voltage to the dynode string in photomultiplier tube 17. When using the preferred photomultiplier tube 17 and adjusting the reference voltage potentiometer 23 so that operating point 26 is initially established when anode current flow is about 60 nanoamperes, then the overall measuring loop gain is considerably lower than in the gage described by Bartlett et al, supra, and the dynode energizing voltage on lead 28 is caused to vary between about −300 volts and about −900 volts when scintillator 14 light source varies from light to dark, or in other words, when plate P thickness varies over a single wide range from zero to maximum. In the present embodiment, this range would be from zero to three inches thickness of plate P.

The electronic servo high voltage source is circuited internally and in self-balancing measuring loop 15 so that when the gaging system is first energized and there is no plate P in radiation beam 12, there is no anode current flowing and therefore no output voltage on photodetector 16 output lead 19. As a result, the reference voltage in comparator-integrator 20 momentarily causes the production of a maximum integrated error voltage on lead 25 which drives high voltage source 27 negative output voltage towards its maximum limit on lead 28 and this voltage energizes the dynode string in photomultiplier 17. As anode current begins to flow, a voltage develops at photodetector 16 output lead 19 which is applied to one of the inputs of amplifier 21 in comparator-integrator 20. Since the summing currents produced by the reference voltage in comparator-integrator 20 and the output voltage on lead 19 are of opposite polarity, the net voltage resulting will be a reducing one and this is the integrated error voltage on lead 25 that is applied to the control input of high voltage source 27. As the integrated error voltage reduces, so does the high voltage source output on lead 28 reduce. This reduction will continue until the integrated error voltage on lead 25 is reduced to a minimum corresponding to a zero thickness value. This minimum value of integrated error voltage is of sufficient value to be amplified in source 27 and cause said source to hold its high voltage output accurately at about the −300 volt value. This causes self-balancing measuring loop 15 to stabilize and the dynode energizing voltage to remain at a constant value representing zero plate P thickness.

When plate P is placed in radiation beam 12 thus causing scintillator 14 light intensity to change, anode current flow changes momentarily and self-balancing measuring loop 15 becomes unstable momentarily until a new integrated error voltage on lead 25 is developed. Later the integrated error voltage becomes stabilized at a value slightly higher than the minimum value by action of the electronic servo. As plate P thickness is varied over a wide range of say 0.0 to 3.000 inches, anode current remains virtually constant while the high voltage source 27 output to the dynode string varies slightly nonlinearly with plate P thickness as illustrated graphically in FIG. 4, curve A.

A fractional portion of the dynode energizing voltage, which varies slightly nonlinearly with respect to plate P thickness, is obtained for further processing by feeding the high voltage on lead 28 through manual zero and attenuator comparator 29. Comparator 29 includes a summing amplifier, a reference voltage connected to the summing amplifier input and adjusted manually to offset the zero thickness dynode voltage and produce a zero voltage at output lead 30, and an adjustable gain feedback network for attenuating the dynode voltage by a factor of 40 so as to establish the slope of a zeroed and attenuated nonlinear thickness signal which is illustrated in FIG. 4, curve B.

Ideally, it would be desirable if in actual practice the degree of differences in exponential or nonlinear relationships of the inverse phenomena described above would result in a linear function, that is, dynode energizing voltage varying linearly with variations in thickness of plate P. This would enable simplification of gaging circuitry even further than has been shown in FIG. 1. However, as is often the case in actual practice, it has been found that up to about 10 percent nonlinearity is experienced at full scale over a single range of measurements as is done herein. That is, during operation of controlled-gain photodetector 16, the dynode energizing voltage on lead 28 varies slightly nonlinearly as the thickness of plate P varies from zero to three inches. This slightly nonlinear relationship is illustrated graphically in FIG. 4, curve A, and also occurs in the fractional portion of the dynode energizing voltage appearing on lead 30. The voltage on lead 30 will hereinafter be referred to as the nonlinear thickness voltage and is illustrated in FIG. 4, curve B.

Still referring to FIG. 1, in order that the nonlinear thickness voltage on lead 30 may be used to provide a linear, direct-reading indication over a wide range of plate thickness, several additional operations are performed on the nonlinear thickness voltage which include linearizing, compensating for variations in plate P composition and/or temperature, automatic zeroing, summing and converting the resulting voltage into digital linear indications of plate P thickness. Selective bypassing has been provided for some of these additional operations where in other applications of the present invention their inclusion is deemed neither necessary nor desirable.

Figure 4:
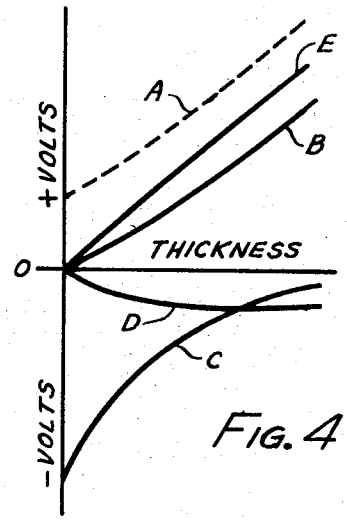
FIG. 4 is a graph illustrating (A) the photomultiplier dynode fractional voltage, (B) zeroed dynode voltage, (C) output of a logarthmic amplifier in the linearizer, (D) linearizer generated voltage, and (E) linearized and scaled voltage, all versus a material property such as thickness.

Turning now to linearizer 31, the manually zeroed slightly nonlinear, thickness voltage appearing on lead 30 which is shown in FIG. 4, curve B, is fed to adjustable-gain logarithmic amplifier 32 which continuously generates a stepless correction voltage to correct the slightly nonlinear thickness voltage, as opposed to generating a step-type correction function as disclosed in Bartlett et al, supra. This enables covering a wider gaging range while providing a more accurate correction for some values of plate P thickness than is possible with the prior art gage. Logarithmic amplifier 32 includes potentiometer 33 receiving the nonlinear thickness voltage from lead 30 and feeding logarithmic diode element 34 such as Philbrick Researches, Inc. Model No. PPL4-P, the latter element being circuited with potentiometer 35. The signal from logarithmic element 34 is fed to the input of operational amplifier 36 which includes a feedback resistor coupled with a smoothing capacitor and where the signal is amplified, including an inherent offset in the thickness signal caused by element 34. The character of thickness signal correction provided by adjustable-gain logarithmic amplifier 32, and occuring on its output lead 37, is illustrated in FIG. 4, curve C. Potentiometer 35 is provided for making a zero thickness correction adjustment to the thickness signal to establish the zero point of FIG. 4, curve C. Potentiometer 33 is provided for making a full scale thickness correction adjustment to the thickness signal to establish the slope of FIG. 4, curve C.

Linearizer 31 also includes comparator 38 which provides an offset in the thickness signal caused by element 34 and inverts and scales-down logarithmic correct thickness signal at lead 37 into desirable units. Comparator 38 includes summing resistor 39, operational summing amplifier 40, an offsetting reference voltage source (not shown) which is adjusted by potentiometer 41 and summed at a junction in opposition to the corrected thickness signal fed through resistor 39, and a feedback resistor 42 about one-fourth the value of resistor 39 for scaling-down the input signal on lead 37. The character of thickness signal inversion, offset and scale-down provided by comparator 38 and occuring on its output lead 43, is illustrated in FIG. 4, curve D. Potentiometer 41 is provided for making a zero thickness offset adjustment to the corrected thickness signal to establish a zero volts per zero thickness signal on lead 43.

In addition, linearizer 31 also includes scaling amplifier 44 where the zeroed, slightly nonlinear thickness voltage on lead 30, FIG. 4, curve B, is summed with the zeroed and corrected thickness voltage on lead 43, FIG. 4 curve D and the sum inverted by operational summing amplifier 45. Feedback gain adjusting potentiometer 46 establishes the initial slope in engineering units to amplifier 45 output. As a result, a linear thickness voltage properly scaled to 3.000 volts for 3.000 inches of plate P thickness is produced on lead 47 and illustrated in FIG. 4 as straight line E. This is also considered the output of linearizer 31.

In practice, linearizer 31 is adjusted by sequentially inserting thickness calibration standards at plate P location into radiation beam 12 and adjusting potentiometers 33 and 46 until linearizer 31 output voltage on lead 47 is linear within system accuracy limits from zero to full scale. Other system nonlinearities such as those introduced by time-dependent variations such as radiation source 10 decay and photomultiplier tube 17 aging can be accommodated by linearizer 31 adjustments because the linearizing function is separated entirely from the photometric function of photomultiplier tube 17 and its self-balancing measuring loop 15.

It would of course have been possible to linearize the slightly nonlinear thickness voltage on lead 30 by operating on it only with logarithmic amplifier 32 and comparator 38, rather than adding a generated nonlinear correction voltage from the inverse nonlinear thickness voltage on lead 30. However, since the excursion of the nonlinear thickness voltage on lead 30, FIG. 4 curve B from FIG. 4 straight line E, is about 10 percent at full scale thickness, a more stable system results by keeping the adjustable elements of devices 32 and 38 in a bypass line to a summing junction at the input of amplifier 45 where any variation in devices 32 and 38 characteristics will cause only a minor change in output thickness voltage and have little effect on output accuracy after initial calibration.

Still referring to FIG. 1, thickness compensator 48 having composition and temperature compensation features for accommodating complex corrective functions will now be described. Ordinarily in laboratory types of radiation thickness gages, the composition, or density, of steel plate P is considered constant as is plate temperature. However, in hot steel plate rolling mills, plate grade is considered constant only for a given plate because throughout daily production runs the plate-to-plate variation in grade, or density, from calibration standards may require as much as plus or minus 10 percent correction of the linear thickness voltage. Similarly, in mill practice plate P temperature is considerably above the 70° F. gage calibration standard, more particularly, in a range of about 1,100° F. to about 2,000° F. In addition, plate P temperature varies during roling and gaging due to changing plate cooling effects. Plate cooling effects are governed by plate grade, temperature and cooling rate, and ambient environmental conditions, and these effects may differ from plate to plate. As will be explained more fully below, variations in plate P temperature cause variations in both the plate's physical and metallurgical properties and these variations also cause plate P density to vary, thus causing a variation in the amount of radiation from beam 12 absorbed by plate P. In practice, plate P temperature variations may require up to about 10 percent additional correction of the linear thickness voltage.

A general understanding of the basic reasons for providing complex grade and temperature compensation of a material thickness signal may be had from the teachings of E. L. Mangan in U.S. Pat. No. 3,482,098. It is to be understood that these teachings are directed to a thickness deviation gaging system instead of a thickness gaging system, to an x-radiation source rather than a high energy nuclear source as the radiation source for gaging, to the gaging of hot steel strip rather than hot steel plate, and that the scaling up of these teachings do not necessarily follow in every respect. However, additional teaching in this respect may be found in the copending application of E. L. Mangan, et al, supra.

Figure 5:
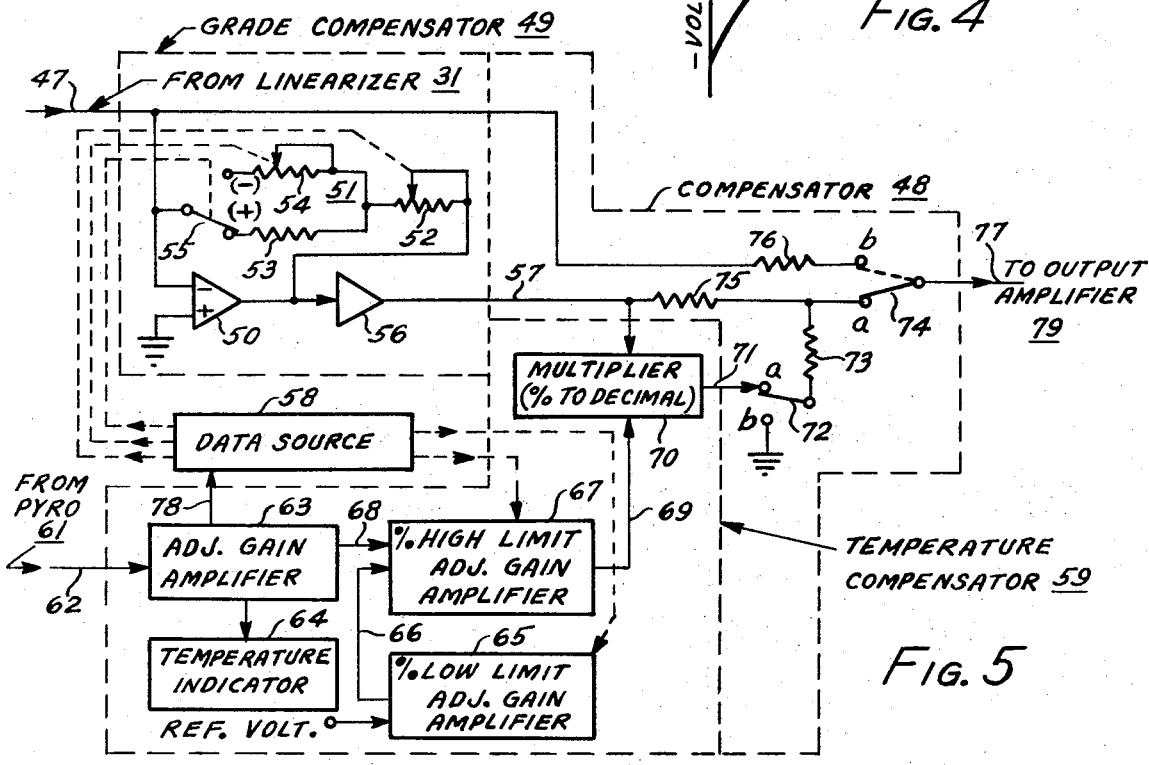
FIG. 5 is a schematic diagram of an improved temperature and grade compensator used in the embodiment shown in FIG. 1.

In the present embodiment, thickness signal compensator 48, which is detailed in FIG. 5, receives the linear thickness voltage on lead 47 and branches it into grade compensator 49 where the linear thickness voltage is modified for variations therein caused by variations in grade of plate P. Variations in grade of plate P cause variations in plate density and, as mentioned above, variations in density also affect the mass absorption coefficient, whereby the combined effects of such variations require a complex corrective function. Bartlett et al copending application states the necessity and manner of selecting both a positive and a negative percent correction of the linear thickness voltage on lead 47 as a function of plate P grade with respect to the composition of calibration standards.

Percentage grade correction of the linear thickness voltage on lead 47 is accomplished by feeding the linear thickness voltage into operational amplifier 50 where, by means of an adjustable feedback network 51, the linear thickness voltage is multiplied by a positive or negative percentage correction factors selected as prescribed by Bartlett, et al, supra. Adjustable feedback network 51 consists of linear potentiometer 52 connected from the output of amplifier 50 in series-parallel with resistor 53 and linear potentiometer 54, the latter two devices being connected to positive (+) and negative (−) poles of a SPDT polarity selector switch 55 which has its common pole also connected the input of amplifier 50. In one arrangement linear potentiometers 52 and 54 may be a ten-turn precision analog device and their sliders provided with a calibrated dial. In another arrangement, potentiometer 52 and 54 may be digital devices having thumb-wheel selectors operated under control of a gaging operator as is switch 55. Or alternatively, both of the digital potentiometer 52 and 54 and polarity selector switch 55 may be relay controlled in response to the action of a data source of a computer described below.

A grade compensation range of plus or minus 10 percent is established by limiting the resistance value of potentiometer 52 and the fixed setting of potentiometer 54 to 0.1 and 0.9 that of resistor 53, respectively. Thus, when setting the slider on potentiometer 52 at 0 percent correction (zero resistance) and turning polarity selector switch 55 to (+) position, the gain of amplifier 50 will remain at unity and the linear thickness voltage will not be multiplied by any percentage factor. However, when setting the slider of potentiometer 52 at any value up to 10 percent (maximum resistance) with selector switch 55 in the (+) position, then the gain of amplifier 50 will be set up to 1.1, thus multiplying the linear thickness voltage by up to plus 10 percent. Minus percentage grade compensation is achieved by reversing the calibration notation on potentiometer 52 so that maximum resistance is 0 percent and zero resistance is minus 10 percent, and the polarity selector seitch is in the (−) position, then 0 percent to minus 10 percent grade compensation occurs when momving the slider of potentiometer 52 through a corresponding range. The gain of amplifier 50 is set in a range between 1.0 to 0.9, thereby multiplying the linear thickness voltage by between 0 percent to minus 10 percent. Inverting operational amplifier 56 receives the output from amplifier 50 and its output provides a grade corrected linear thickness signal in terms of volts per inch thickness on lead 57 which is also the output of grade compensator 49.

Data source 58 is provided to determine the position of, and if desired to actuate, grade polarity selector switch 55 and the percentage settings of the slider on potentiometer 52 and 54, or its equivalent, for compensating the linear thickness voltage the correct grade percentage as determined from the aforesaid notation. Prior to gaging, the percentage and polarity of grade correction data is pre-calculated and tabularized for each different type of plate P grade expected to be gaged. When using either the analog form or the thumb wheel digital form of potentiometer 52 in grade compensator 49, the tabular correction data may be in chart from suitable for a gage operator to read and cause manipulation of switch 55 and the slider of potentiometer 52 to required percentage correction positions corresponding to a known grade of plate P. When using the digital relay form of potentiometer 52, the relays may be controlled in response to tabular data stores in a computer incorporated, but not shown, in data source 58.

Thickness signal compensator 48 also includes temperature compensator 59 for modifying the grade-compensated linear thickness signal on lead 57 for variations therein caused by variations in temperature of plate P. As noted above, the amount of radiation absorbed by steel plate P is a function of the mass of steel plate P in radiation beam 12. When plate P is at a temperature elevated above room temperature it expands volumetrically, i.e., in three dimensions, thereby causing a portion of the mass which has expanded in the plane perpendicular to radiation beam 12 to leave the beam and not be available for energy absorption. This effect of changing mass results in plate P appearing thinner to radiation beam 12 than when at room temperature, thus requiring a positive correction to be made in the grade-compensated linear thickness voltage on lead 57. It should be recalled that variations in plate mass which are occasioned by variations in plate temperature also cause variations in plate density and mass absorption coefficient which also require a complex corrective function. The actual percent temperature correction as a function of plate P temperature is also described in Bartlett, et al, supra.

Density of steel plate P varies as a predetermined function of plate chemical composition, plate temperature and rate of cooling. It is well known that steel is a crystalline structure and that the behavoir of such structures changes at elevated temperatures. Further, that the degree of change and temperature at which such changes occur varies widely, depending on the chemical composition, temperature and rate of cooling of the steel. In one example of such phenomena, a steel plate P having known amounts of iron, carbon and other alloying elements, a known elevated temperature, and a desired rate of cooling, will exhibit density versus temperature properties as illustrated graphically in FIG. 6 curve A. Other steel alloys, as well as other materials, will differ in curvature, slope and starting point.

Figure 6:
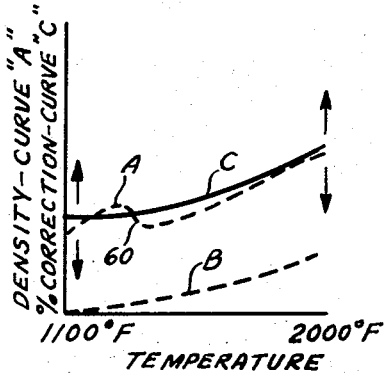
FIG. 6 is a graph illustrating (A) the effects of steel plate density versus temperature, (B) nonlinear output of a pyrometric plate temperature sensor, and (C) the percent correction applied to the thickness signal by a temperature compensator of the present invention.

When interpreting FIG. 6 curve A, a sharp reversal in curvature occurring at point 60 will be noted. This reversal occurs at what is known as the transformation temperature of steel plate P. That is, the temperature at which a change in phase occurs in the steel alloy structure, for example, when austenite which formed during heating changes to ferrite upon cooling or to ferrite plus cementite when cooling is completed. There are transformation temperature ranges, that is, ranges of temperatures at which austenite forms during heating and transforms into ferrite, etc. during cooling. The heating and cooling temperature ranges are distinct, sometimes overlap but never coincide, and the cooling ranges are lower than the heating ranges. The limiting temperatures of each range depend on the composition of the steel alloy and on the rate of change of temperature, particularly during cooling. In addition, when accommodating a wide range of steel alloys, the transformation temperature range varies in span and location along the temperature axis in FIG. 6, curve A; the location of the transformation temperature, i.e., point 60 varies along the temperature axis and sometimes occurs at a temperature of less than 1,100° F.; the starting point and initial slope of curve A at 1,100° F., as well as the vertical separation at point 60 and the final slope of curve A, all vary in magnitude with chemical composition and cooling rate of steel plate P.

All of the foregoing variable factors establish the metallurgical properties of steel plate P which affect its density. Variations in metallurgical properties, together with the above-noted variations in the physical property of steel plate P due to mass redistribution from volumetric expansion, make up the total variations in density over a given temperature range and are operative in determining a particular value of correction for a given steel plate P. Thus, it will become apparent that to accommodate a variety of steel alloys, and other materials, the specific percentage correction applied by temperature compensator 59 to the grade-compensated linear thickness voltage on lead 57 must be determined from a data source covering a number of physical and chemical properties of a variety of materials to be gaged. Also, temperature compensation must be applied over a given range, such as between a low limit of about 1,100° F. and a high limit of about 2,000° F. as experienced in a hot steel plate rolling mill.

Provisions are made in temperature compensator 59 for a high degree of flexibility in establishing the independent selection of either positive or negative percent temperature compensation applied at the low and high temperature limits, as well as in establishing the starting and ending percentages of correction at said temperature limits, thereby enabling the establishment of any rate, or rate change, of temperature compensation required within predetermined percentage correction limits. Provisions are also made for proportioning the percentage temperature compensation established between temperature limits according to an actual temperature measurement of plate P at any time during gaging.

The correction function of temperature compensator 59 is under control of optical pyrometer 61, shown in FIG. 1, which senses plate P temperature in the vicinity of radiation beam 12. Pyrometer 61 has a nonlinear output voltage in the range of 1,100° F. to 2,000° F. which appears on lead 62 and is illustrated graphically in FIG. 6, curve B. The nonlinear temperature voltage is fed to adjustable gain amplifier 63 in temperature compensator 59 where it is normally amplified a prescribed amount for positive correction and then fed to temperature indicator 64, the latter having a nonlinear scale. Adjustable gain operational amplifier 65 receives and amplifies a fixed reference voltage a prescribed amount for positive correction as determined by the setting on a feedback potentiometer (not shown) to establish a percent temperature correction low limit voltage on output lead 66. Adjustable gain operational amplifier 67 receives the amplified nonlinear temperature voltage through a gain adjusting potentiometer (not shown) and sums it with the percent temperature correction low limit voltage on lead 66 and amplifies the sum a prescribed amount as determined by the value of a fixed feedback resistor (not shown) to establish the slope of a positive percent temperature correction, or in other words, the magnitude of the percent temperature correction high limit voltage on output lead 69. The potentiometers for setting the gain on low- and high-limit amplifiers 65 and 67 may consist of either of the precision analog or digital devices referred to in the description of potentiometer 52. Further, the sliders on the potentiometers for amplifiers 65 and 67 are set according to the provisions of data source 58 as will be explained below.

When properties of the material being gaged require a positive maximum of say 10 percent temperature correction, the resisthance value of the potentiometers in amplifiers 65 and 67 should be 0.1 that of the total feedback resistance. By suitably adjusting the low-limit and high-limit potentiometers, the gain of amplifiers 65 and 67, respectively, may be set at say a positive 2 percent and 4 percent temperature correction, respectively, occurring at 1,100° F. and 2,000° F., respectively. This type of correction, which actually follows the nonlinear temperature voltage, is illustrated graphically in FIG. 6, curve C. This is the best-fit nonlinear temperature correction which is used to modify the grade-compensated linear thickness voltage as required for the density versus temperature properties of the particular steel plate P illustrated in FIG. 6, curve A. Other steel alloys, as well as other materials, may require different settings of the potentiometers associated with amplifiers 65 and 67.

Further, when properties of the material being gaged require a negative percent temperature correction, then the polarity of pyrometer 61 signal on lead 62 is reversed at the input of amplifier 63, and the polarity of the reference signal associated with amplifier 65 is reversed. Therefore, the output of amplifier 67 on lead 69 is also reversed. The inverse of FIG. 6, curve C would illustrate this type of negative percent correction. Polarity reversal may also be accomplished with suitable switching arrangements (not shown) if both positive and negative percent correction is required in the same gage.

Whatever specific temperature correction factor have been established, it is presumed that the gain of amplifiers 63, 65 and 67 have been set appropriately to produce the best fit, nonlinear, percent temperature correction voltage (FIG. 6, curve C) on lead 69 to effectively offset the specific nonlinear density properties of plate P (as represented by FIG. 6, curve A) so that the percent temperature correction voltage will have a linear correction effect on the grade-compensated linear thickness voltage, within the predetermined limits of system accuracy. Such being the case, the percent temperature correction voltage on lead 69, and the grade-compensated linear thickness voltage (volts per inch of plate P thickness) on lead 57, are fed to two separate inputs of electronic multiplier 70, such as is manufactured by Zeltex, Inc., Concord, Calif., Model No. ZM 605M20. The product of these two voltages, which is present on temperature compensator 59 output lead 71, is the thickness correction signal for temperature compensation and is now in terms of 10 millivolts per thousandths of an inch thickness of plate P. This voltage is passed through selector switch 72, position $a$, and through summing resistor 73 to a summing junction of selector switch 74, position $a$, where it is algebraically summed with the grade-compensated linear thickness voltage which passes through summing resistor 75, the latter having 0.1 the value of resistor 73 and is connected to the summing junction at switch 74, position $a$. With this circuit arrangement, the algebraically summed voltages provides a grade and temperature compensated linear thickness voltage on compensator 48 output lead 77 which is fed to an output amplifier described below.

In some applications of the present invention it may be desirable to omit the positive or negative corrective effects on the linear thickness voltage produced by grade compensation 49 and/or temperature compensator 59. In such cases, both grade and temperature compensators 49 and 59 may be by-passed by feeding the linear thickness voltage on lead 47 through summing resistor 76 to select switch 74, position $b$, and directly to compensator 48 output lead 77. Where grade compensation only is required, selector switch 72 is moved to position $b$, thereby disabling the voltage effect of temperature compensator 59 on the compensator 48 output lead 77. Where temperature compensation only is required, the gain of amplifier 50 in grade compensator 49 is adjusted to unity by manipulating potentiometer 52 and selector switch 55 to their 0 percent correction positions as described above. The linear thickness output voltage on lead 57 will be the same as that on input lead 47, thereby enabling temperature compensator 59 to function normally.

The data source 58 noted above is also provided to determine the position of, and if desired to actuate, the percentage settings of amplifier 65 and 67 potentiometer sliders or their equivalent, for compensating the linear thickness voltage, or the grade-compensated linear thickness voltage, the correct temperature percentages as pre-determined from requirements noted above. Prior to gaging, the percentage, and polarity if necessary, of temperature correction data is pre-calculated and tabularized for each different type of plate P composition, density versus temperature, and cooling rate expected to be encountered during gaging. When using either the analog form or the thumb-wheel digital form of potentiometers for amplifiers 65 and 67 in temperature compensation 59, the tabular correction data may also be in chart form suitable for a gage operator to read and cause manipulation of these potentiometer sliders to low- and high-percentage correction positions corresponding to known properties of plate P. When using the digital relay form of potentiometers for amplifiers 65 and 67, the relays may be controlled in response to tabular data also stored in the unidentified computer in data source 58 as noted above for grade compensation.

In some hot steel plate rolling mills the composition and cooling rate variations in plate P may be sufficiently small that such effects on temperature correction of the thickness signal are tolerable within prescribed gaging system accuracy limits. This will permit pre-setting of the potentiometer sliders for amplifiers 65 and 67 initially and making necessary adjustments thereto only at the time of gage calibration. In other installations, the cooling rate of plate P may change after initial settings of these potentiometer sliders and/or during gaging of a particular plate P, thus requiring a change in position of either or both sliders to maintain the proper amount temperature correction of the thickness signal. For this reason the amplified temperature signal is fed from pyrometer amplifier 63 over lead 78 to data source 58. Here plate temperature and rate of temperature change may be indicated to a gage operator so that appropriate changes may be made in the position of potentiometer slider for amplifier 65 and/or 67 in order to produce the proper temperature compensation of the thickness signal. Alternatively, the linear temperature signal may be fed to the unidentified computer in data source 58 to determine plate temperature and rate of temperature change in order to effect the necessary changes in temperature compensation of the thickness signal.

Referring back to FIG. 1, the grade and temperature compensated linear thickness voltage from compensator 48 is fed over lead 77 to one input of output amplifier 79, a conventional differential operational amplifier having another input circuited to an automatic zero control feature for continuously offsetting gaging zero drift as described below. Amplifier 79 output is connected to output lead 80.

From time to time during normal rolling mill operations foreign matter becomes lodged on the windows in the upper and lower portions of the above-mentioned gage housing. Also, the measuring circuits experience electrical drift from calibrated conditions. These have the effect of producing an offset in gage zero and will contribute an error to thickness measurements unless a correction is made. For this reason the gaging apparatus herein is provided with automatic zero adjusting means 81 for continuously adjusting gage zero when there is no plate P being gaged. This feature maintains the origin of the linear thickness signal illustrated in FIG. 4, curve E, such that the output signal from amplifier 79 is always zero when there is no plate P in the gaging apparatus. Also, in conjunction with comparator-integrator 20 in self-balancing measuring loop 15 which maintains the slope and linear characteristic of the linear thickness voltage illustrated in FIG. 4, curve E, the calibration of the linearized and compensated thickness output signal from amplifier 79 remains constant even though the radiation detected by photomultiplier tube 17 changes by reason of source 10 decay, electrical drift occurring in the measuring circuits, or for other reasons stated above.

Automatic zero adjusting means 81 includes material detector 82 which has a level comparator 83 receiving the slightly nonlinear thickness voltage on lead 30 and energizes relay 84 when the thickness voltage exceeds a nominal preset value above zero thickness. This action indicates a plate P is in the gage, otherwise when relay 84 is deenergized it indicates the absence of plate P from the gage. Also included in means 81 is automatic zeroing circuit 85 which has switched integrator 86 receiving the output of differential output amplifier 79 on lead 80 under control of relay contact 84a and limit switch 99 and feeding its output to the second input of output amplifier 79 by way of lead 87. Limit switch 99 closes only in an off-line gaging position where plate P is not being gaged. Thus, when any zero shift or error occurs during the absence of plate P from the gage, integrator 86 output acts in opposition to the thickness voltage on lead 77 and forces output amplifier 79 to zero output. When detector 82 senses the presence of plate P, relay contact 84a opens. When the gage is moved toward an on-line position, limit switch 99 opens. Either circuit opening causes integrator 86 output to hold at the instantaneous value when this occurs, thus establishing gage zero while maintaining the origin of the thickness signal as illustrated in FIG. 4, curve E. When plate P leaves the gage, relay contacts 84a close, and when the gage returns to its off-line position limit switch 99 contacts, then device 86 is again permitted to integrate and act on output amplifier 79.

Output amplifier 79 thickness voltage on lead 80 is also fed to thickness indicator 88, a digital voltmeter calibrated in terms of plate P thickness over a single wide range of from 0.0 to 3.000 inches in thousandths of an inch increments. Thickness indicator 88 operates under control of readout control 89 which allows indicator 88 to read instantaneous measurements until a readout command is received, at which time it holds the current reading on indicator 88 until a reset command is received. Thickness indicator 88 also generates a digital thickness signal on lead 90 which is available under the hold mode for using during a thickness deviation or plate P profiling arrangement as will be described below. Alternatively, the digital voltmeter used for thickness indicator 88 may be a recorder or a computer utilization device. In any event, the thickness voltage received thereby is linearized, compensated for variations in grade and temperature of plate P, and automatically zeroed for electrical drift throughout the gaging apparatus.

In certain hot plate mill rolling operations it is desireous for the mill operator to not only be able to ascertain plate P thickness, but also thickness deviation or profile along a gaging path from end-to-end of plate P. The second copending application of Bartlett, et al, noted above discloses one arrangement for doing this. However, in the present invention, the thickness deviation or profiling feature is provided by feeding the digital output signal maintained by indicator 88 on lead 90 through selector switch 91, position *a*, to digital-to-analog convertor 92 where it is converted from a digital thickness signal to an analog thickness voltage of equal magnitude but oppositely polarity as the analog thickness voltage on lead 80. Convertor 92 output is fed through selector switch 93, position *b*, to an internal summing junction at the first input of output amplifier 79 where it is algebraically summed with the analog thickness signal on lead 77. Thus, output amplifier 79 output will be zero, as well as the voltage on lead 80, at the first measurement location of plate P in the gage. Subsequently, a deviation in plate P measurement will cause a different thickness voltage to occur on lead 77 and this will cause a small thickness deviation voltage to occur on lead 80. Inasmuch as thickness indicator 88 is in the hold mode, this small thickness deviation voltage will not affect its steady reading of the first plate P measurement. However, the small thickness deviation voltage is also fed from lead 80 through driver amplifier 95 to thickness deviation meter 96. Meter 96 is a zero-center milliameter calibrated for plus and minus 0.010 inch full scale and is normally shunted by switch 97 during thickness only measurements to prevent burn-out, but switch 97 is opened during thickness deviation measurements. As a result, the rolling mill operator not only has an initial indication of plate P thickness when it enters the gage, but also a thickness deviation or profile during gaging of the remainder of plate P.

An additional feature of the present invention is the ability to check gage calibration and facilitate recalibration of the gaging apparatus electrical output signals. This feature utilizes the plate P thickness deviation measuring arrangement described above except that it substitutes digital thickness selector switches 98 for the digital thickness signals maintained on lead 90 by moving selector switch 91 to position *b*. Device 98 includes thumbwheel selector switches arranged for contact closure or opening to form a digital representation of desired digital thickness. To check gage calibration, standards are inserted sequentially by magazine 11 into radiation beam 12 and corresponding settings of the digital selector switches 98 are made at the same time. Thickness deviation indicator 96 will indicate the error in gage calibration at each thickness selected throughout the single wide range of gage operation.

We claim:

1. In a material measuring system which converts radiation into a light source that varies as a function of a material property and a conversion error due to radiation source decay, said system having a self-balancing measuring loop which includes a controlled-gain photodetector responsive to said variable light source and subject to a gain error caused by photodetector aging, said measuring loop also including comparator means operative therein to cause the production of a material measuring signal which varies as a function of said variable light source and said conversion and gain errors, said errors having an undesirable effect on measuring loop stability, the improvement comprising:
    a. integrator means circuited to modify said comparator means for stabilizing the self-balancing measuring loop against the undesirable effects of said conversion and gain errors, and
    b. means for utilizing the stabilized measuring signal to determine a value of said material property.

2. In a material measuring system which converts radiation into a light source that varies as a function of a material property and a conversion error having the effect of a variable zero shift, said system having a photo-responsive self-balancing measuring loop which produces a material measuring signal that varies as a function of said variable light source and the conversion zero shift, the improvement comprising:
    a. circuit means external said measuring loop which is responsive differentially to the material measuring signal and a zero off-setting signal for producing a material measuring output signal having a constant zero base,
    b. circuit means including integrator means circuited across the output to the input of means (a) and responsive to a material detector for automatically zeroing said material output signal by generating said zero offsetting signal during the absence of material from said zero gage and holding the value of said zero offsetting signal the instant material presence is detected in the gage, thereby overcoming the conversion zero shift as well as subsequent electrical drift errors, and
    c. means for utilizing the zeroed material measuring output signal to determine a value of said material property.

3. In a material measuring system which converts radiation into a light source that varies as a function of a material property and conversion errors due to radiation source decay and a variable zero shift, said system having a self-balancing measuring loop which includes a controlled-gain photodetector responsive to said variable light source and subject to a gain caused by photodetector aging, said measuring loop also including comparator means operative therein to cause the production of a material measuring signal which varies as a function of said variable light source and said conversion, gain and zero shift errors, said errors having an undesirable effect on measuring loop stability, the improvement comprising:
    a. integrator means circuited to modify said comparator means for stabilizing the self-balancing measuring loop against the undesirable effects of said conversion and gain errors,
    b. circuit means external said measuring loop which is responsive differentially to the material measuring signal and a zero off-setting signal for producing a material measuring output signal having a constant zero base,
    c. circuit means including integrator means circuited across the output to the input of means (b) and responsive to a material detector for automatically zeroing said material output signal by generating said zero offsetting signal during the absence of material from said gage and holding the value of said zero offsetting signal the instant material presence is detected in the gage, thereby overcoming the conversion zero shift error as well as subsequent electrical drift errors, and d. means for utilizing the automatically stabilized and zeroed measuring output signal to determine a value of said material property.

4. In a material measuring system which converts radiation into a light source that varies nonlinearly as a function of a material property, said system having a photo-responsive self-balancing measuring loop which produces a material measuring signal that varies slightly nonlinearly as a function of said material property, the improvement conprising:

a. circuit means for linearizing the slightly nonlinear material measuring signal, comprising:
    1. an adjustable gain logarithmic amplifier including a logarithmic element receiving said nonlinear measuring signal and generating a stepless correction signal over a wide range of system operation, said amplifier having an inherent characteristic which causes an offset in said correction signal,
    2. adjustable comparator means for cancelling the offset in said correction signal, and
    3. a scaling amplifier for summing the slightly nonlinear material measuring signal with the correction signal and including gain adjusting means for setting the initial slope of the summed signals, and
  b. means for utilizing the linearized measuring signal to determine a linear value of said material property.

5. In a measuring system which converts radiation into a light source that varies as a function of a material property and variations in one or more additional properties having a predetermined variable effect on measuring the material first property, said system having a photo-responsive self-balancing measuring loop which produces material measuring signal that varies as a function of said material first property and said one or more additional properties, the improvement comprising:

a. circuit means including compensator means for connecting the material measuring signal for variations caused by variations in said one or more additional properties, comprising:
    1. first circuit means adjusted by a first external signal for scaling said measuring signal according to predetermined correction needs attributed to a second material property variation,
    2. second circuit means for scaling a third material property signal a predetermined amount, said second circuit means adapted to be adjusted by a second external signal for establishing low and high limits to a range of correction needs attributed to the third material property variations,
    3. third circuit means for multiplying the outputs of said first and second circuit means by each other to obtain a product signal, and
    4. fourth circuit means for selecting a single or combined compensated output signal derived from said material property signal, the first circuit means, the third circuit means and the sum of first and third circuit means, and b. means for utilizing the compensated measuring signal to determine a compensated value of said material first property.

6. In a material measuring system which converts radiation into a light source that varies as a function of a material property, said system having a photo-responsive self-balancing measuring loop which produces an analog material measuring signal that varies as a function of said variable light source, the improvement comprising:

a. analog circuit means external said measuring loop which is responsive differentially to the material measuring signal and another signal for producing a material measuring output signal,
  b. circuit means for digitizing the material measuring output signal and storing an initial digital value thereof when said material first enters said measuring system,
  c. circuit means for converting the stored digital material measuring output signal into a steady analog signal corresponding thereto and applying said analog signal to circuit means (a) as said other differential signal, thereby converting circuit means (a) output to a material measuring output signal which deviates from the initial digital signal stored in circuit means (b), and
  d. means for utilizing the material measuring deviation output signal of circuit means (a) to determine the profile of said material property subsequent to said initial measurement thereof.

7. In a material measuring system which converts raditation into a light source that varies as a function of a material property, said system having material calibration standards selectively insertable into a measuring beam of radiation, said system also having a photo-responsive self-balancing measuring loop which produces an analog material measuring signal that varies as a funtion of said variable light source, the improvement comprising:

a. analog circuit means external said measuring loop which is responsive differentially to the material measuring signal when selectively inserting calibration standards into said radiation beam and to a desired material property signal for producing a material measuring deviation output signal,
  b. circuit means for selectively generating and storing a desired digital material property signal corresponding to a given material calibration standard inserted into said beam of radiation,
  c. circuit means for converting the stored desired digital material measuring signal into a steady analog signal corresponding thereto and applying said analog signal to circuit means (a) as said desired material property signal, and
  d. means for utilizing the material measuring deviation output signal of circuit means (a) to determine the deviation of said system electrical calibration from said material calibration standards for said material property.

8. In a material measuring system which converts radiation into a light source as a function of a material property and conversion errors due to radiation source decay and a variable zero shift, wide-range photoelectric gaging apparatus, comprising:

a. self-balancing measuring loop means which includes a controlled-gain photodetector responsive to said variable light source and subject to a gain error caused by photo-detector aging, said measuring loop means including comparator-integrator means operative therein to cause the production of a material measuring signal which varies as a function of said light source and the aforesaid errors, except that the measuring loop is stabilized against the conversion decay and gain errors by the integrator circuited in said comparator means, c. circuit means external said measuring loop which is responsive differentially to the material measuring signal and a zero offsetting signal for producing a material measuring output signal having a constant zero base, c. circuit means including integrator means circuited across the output to the input of means (b) and responsive to a material detector for automatically zeroing said material output signal by generating said zero offsetting signal during the absence of material from said gage and holding the value of said zero offsetting signal the instant material presence is detected in the gage, thereby overcoming the conversion zero shift error as well as subsequent electrical drift errors, and d. means for utilizing the automatically stabilized and zeroed measuring output signal to determine a value of said material property.

9. The measuring system of claim 8 wherein the light source varies nonlinearly and there is a corresponding slight nonlinearity in the material measuring signal over a wide-range of gage operation, and said gaging apparatus includes the following after means (a):

e. circuit means for linearizing the slightly nonlinear material measuring signal, comprising:
  1. an adjustable gain logarithmic amplifier including a logarithmic element receiving said nonlinear measuring signal and generating a stepless correction signal over a wide range of system operation, said amplifier having an inherent characteristic which causes an offset in said correction signal,
  2. adjustable comparator means for cancelling the offset in said correction signal, and
  3. a scaling amplifier for summing the slightly nonlinear material measuring signal with the corrective signal and including gain adjusting means for setting the initial slope of the summed signals.

10. The measuring system of claim 8 wherein the light source also varies as function of variations in one or more additional properties having a predetermined variable effect on measuring the material first property, and said material measuring signal also varies as a function of said one or more additional properties, and said gaging apparatus include the following after means (a):

f. circuit means including compensator means for correcting the material measuring signal for variations caused by variations in said one or more additional properties, comprising:
  1. first circuit means adjusted by a first external signal for scaling said measuring signal according to predetermined correction needs attributed to a second material property variation,
  2. second circuit means for scaling a third material property signal a predetermined amount, said second circuit means adapted to be adjusted by a second external signal for establishing low and high limits to a range of correction needs attributed to the third material property variations,
  3. third circuit means for multiplying the outputs of said first and second circuit means by each other to obtain a product signal, and
  4. fourth circuit means for selecting a single or combined compensated output signal derived from said material property signal, the first circuit means, the third circuit means and the sum of first and third circuit means.

11. The measuring system of claim 8 wherein there is an analog material measuring signal and means (d) is deleted, and said gaging apparatus further includes the following after means (a):

g. analog circuit means external said measuring loop which is responsive differentially to the material measuring signal and another signal for producing a material measuring output signal, h. circuit means for digitizing the material measuring output signal and storing an initial digital value thereof when said material first enters said measuring system, i. circuit means for converting the stored digital material measuring output signal into a steady analog signal corresponding thereto and applying said analog signal to circuit means (g) as said other differential signal thereby converting circuit means (g) output to a material measuring output signal which deviates from the initial digital signal stored in circuit means (h), and j. means for utilizing the stabilized, zeroed, material measuring deviation output signal of circuit means (g) to determine the profile of said material property subsequent to said initial measurement thereof.

12. The measuring system of claim 8 modified to exclude means (d) wherein said gaging apparatus further includes:

k. material calibration standards adapted to be inserted into a beam of radiation in place of said material to be measured, thus causing said light source to vary as a function of said standards, l. analog circuit means external said measuring loop which is responsive differentially to the material measuring signal when selectively inserting calibration standards into said radiation beam and to a desired material property signal for producing a material measuring deviation output signal, m. circuit means for selectively generating and storing a desired digital material property signal corresponding to a given material calibration standard inserted into said beam of radiation, n. circuit means for converting the stored desired digital material measuring signal into a steady analog signal corresponding thereto and applying said analog signal to circuit means (1) as said desired material property signal, and i. means for utilizing the stabilized, zeroed, material measuring deviation output signal of circuit means (1) to determine the deviation of said system electrical calibration from said material calibration standards for said material property.

13. Apparatus for gaging a material property over a wide range, comprising:

a. means for producing a substantially constant source of penetrative radiation having a long-term decay while beamed at said material, whereby emerging radiation varies according to a nonlinear absorption characteristic of said material property and an error due to source decay, b. a scintillator for converting said nonlinear radiation into a corresponding nonlinear light source which varies as a function of said material property and said decay error, said scintillator subjected to effects which cause a variable zero shift error in said conversion, c. self-balancing measuring loop means comprising:
  1. controlled-gain photodetector means having a nonlinear gain characteristic inverse said nonlinear light source characteristic for producing a variable detector signal in response to variations in said light source, the aforesaid errors, and to a gain-controlling energizing signal,
  2. comparator-integrator means responsive to the difference between said detector signal and a comparator reference signal for producing an integrated error signal which varies proportional to said zero shift error and slightly nonlinearly relative said material property, whereby the integrator portion of this means maintains the current of an anode in said photodetector at a virtually constant value while automatically stabilizing said measuring loop against undesirable effects of the aforesaid decay and gain errors, and
  3. a variable source of gain-controlling energizing signal operative in response to said integrated error signal for varying photodetector gain, said energizing signal varying slightly nonlinear relative said material property and proportional to the aforesaid zero shift error, thereby being designated a material measuring signal, d. circuit means including linearizer means for linearizing a slight nonlinearity in a portion of said material measuring signal, e. circuit means for automatically offsetting the modified material measuring signal for the effects of the aforesaid zero shift error and subsequent errors due to electrical drift in the aforesaid circuits, and f. means for utilizing said modified and automatically stabilized and zeroed measuring signal to determine a value of said material property.

14. The gaging apparatus of claim 13 wherein said emerging radiation also varies as a function of variations in one or more additional properties having a predetermined variable effect on measuring the material first property, and said modified material measuring signal from means (d) also varies as a function of said one or more additional properties, said gaging apparatus further including:

g. means for correcting (d) signal by compensating said signal for predetermined effects thereon caused by variations in said one or more additional properties.

15. The gaging apparatus of claim 13 modified to exclude means (f) and including the following:

h. means responsive to means (d) signal for producing an initial material measuring signal when said material first enters said gaging apparatus and thereafter producing a material measuring deviation signal which deviates from the initial material measuring signal, and i. means for utilizing the automatically stabilized and modified material measuring deviation signal to determine the profile of said material property subsequent to said initial measurement thereof.

16. The gaging apparatus of claim 13 modified to exclude means (f) and include the following:

j. material calibration standards adapted to be inserted into said beam of radiation in place of said material to be measured, thus causing the stabilized, zeroed and modified material measuring signal of means (e) to vary as a function of said standards, k. means for producing a predetermined electrical calibration signal corresponding to a material calibration standard and for combining said electrical calibration signal with said means (e) signal to generate an automatically stabilized, zeroed and modified material measuring deviation signal based on the difference of said two signals, and l. means for utilizing the means (k) signal to determine the deviation of said gaging apparatus electrical calibration from said material calibration standards for said material property.

17. In a material measuring system which converts radiation into a light source that varies as a function of a material property and a conversion error due to radiation source decay, said system having a self-balancing measuring loop which includes a controlled-gain photodetector responsive to said variable light source and subject to a gain error caused by photodetector aging, said conversion and gain errors having an undersirable effect on measuring loop stability, said measuring loop including:

a. comparator-integrator means operative in said measuring loop for causing the production of a material measuring signal which varies as a function of said light source, and for stabilizing said material measuring signal and said measuring loop against the undesirable effects of said conversion and gain errors.

18. In a material measuring system which converts radiation into a light source that varies as a function of a material property and a conversion error due to radiation source decay, said system having a self-balancing measuring loop which includes a controlled-gain photodetector responsive to said variable light source and subject to a gain error caused by photodetector aging, said conversion and gain errors having an undesirable effect on measuring loop stability, said measuring loop including:

a. comparator-integrator means operative in said measuring loop for causing the production of a material measuring signal which varies as a function of said light source, and for stabilizing said material measuring signal and said measuring loop against the undesirable effects of said conversion and gain errors, and b. a voltage controlled high voltage source responsive to the stabilized material measuring signal and operative on said photodetector to control the gain thereof.

19. In a material measuring system which converts radiation into a light source that varies as a function of a material property and a conversion error due to radiation source decay, said system having a self-balancing measuring loop which includes a controlled-gain photodetector having a photomultiplier tube responsive to said variable light source and subject to a gain error caused by photodetector aging, said conversion and gain errors having an undesirable effect on measuring loop stability, said measuring loop including:

a. an amplifier responsive to the output of said photomultiplier tube,
b. comparator-integrator means operative in said measuring loop in response to the output of said amplifier for causing the production of a material measuring signal which varies as a function of said light source, and for stabilizing said material measuring signal and said measuring loop against the undesirable effects of said conversion and gain errors, and
c. a voltage controlled high voltage source responsive to the stabilized material measuring signal and operative on said photomultiplier tube to control the gain thereof.

* * * * *

UNITED STATES PATENT OFFICE
CERTIFICATE OF CORRECTION

PATENT NO. : 3,864,573

DATED : February 4, 1975

INVENTOR(S) : Carvel D. Hoffman and Duane T. Jones

It is certified that error appears in the above-identified patent and that said Letters Patent are hereby corrected as shown below:

Page 1, under Attorney, Agent, or Firm "John I. Iverson; John I. Inversion; George G. Dower" should read
--Joseph J. O'Keefe, John I. Iverson; George G. Dower--.

Page 1, col. 2 - ";6 Claims, 6 Drawing Figures" should read --19 Claims--

Col. 3, lines 22 and 23 "engaged" should read --gaged--.
Col. 3, line 29, insert --circuits-- before the word "thereto".

Col. 8, line 23, insert the word --wide-- before "range".
Col. 9, line 67, insert the word --signal-- before "compensator".
Col. 10, line 15, "roling" should read --rolling--.
Col. 11, line 10, "source of" should read --source or--.
Col. 11, line 30, "seitch" should read --switch--.
Col. 11, line 32, "momving" should read --moving--.
Col. 11, line 54, "from" should read --form--.

Col. 14, line 64, "select" should read --selector--.
Col. 16, line 66, "using" should read --use--.
Col. 17, line 19, "oppositely" should read --opposite--.
Col. 19, claim 4, line 7, "conprising" should read --comprising--.
Col. 19, claim 4, line 10, "1." should read --.1--.
Col. 19, claim 4, line 17, "2." should read --.2--.
Col. 19, claim 4, line 19, "3." should read --.3--.
Col. 19, claim 5, line 7, insert --a-- before "material".
Col. 19, claim 5, line 12, "connecting" should read --correcting--.
Col. 19, claim 5, line 15, "1." should read --.1--.
Col. 19, claim 5, line 19, "2."should read --.2--.

UNITED STATES PATENT OFFICE
CERTIFICATE OF CORRECTION

Page 2

PATENT NO. : 3,864,573

DATED : February 4, 1975

INVENTOR(S) : Carvel D. Hoffman and Duane T. Jones

It is certified that error appears in the above-identified patent and that said Letters Patent are hereby corrected as shown below:

Col. 19, claim 5, line 25, "3." should read --.3--.
Col. 19, claim 5, line 28, "4." should read --4.--.

Col. 21, line 9, "c." should read --b.--.
Col. 21, claim 9, line 8, "1." should read --.1--.
Col. 21, claim 9, line 16, "2." should read --.2--.
Col. 21, claim 9, line 18, "3." should read --.3--.
Col. 21, claim 9, line 19 and 20, "correcion" should read --correction--.
Col. 21, claim 10, line 12, "1." should read --.1--.
Col. 21, claim 10, line 16, "2." should read --.2--.
Col. 22, claim 10, line 1, "3." should read --.3--.
Col. 22, claim 10, line 4, "4." should read --.4--.
Col. 22, claim 12, line 23, "i." should read --o--.
Col. 23, claim 13, line 10, "1." should read --.1--.
Col. 23, claim 13, line 16, "2." should read --.2--.
Col. 23, claim 13, line 27, "3." should read --.3--.

Signed and Sealed this ninth Day of December 1975

[SEAL]

Attest:

RUTH C. MASON
*Attesting Officer*

C. MARSHALL DANN
*Commissioner of Patents and Trademarks*